(12) United States Patent
Ting et al.

(10) Patent No.: US 10,811,769 B2
(45) Date of Patent: Oct. 20, 2020

(54) LIQUID-CRYSTAL ANTENNA APPARATUS AND METHOD FOR TRACKING WIRELESS APPARATUS USING THE SAME

(71) Applicant: InnoLux Corporation, Miao-Li County (TW)

(72) Inventors: Chin-Lung Ting, Miao-Li County (TW); Chen-Chang Wang, Miao-Li County (TW); Kuang-Hsiang Lee, Miao-Li County (TW); Hsiu-Tung Lin, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 143 days.

(21) Appl. No.: 16/000,242

(22) Filed: Jun. 5, 2018

(65) Prior Publication Data

US 2019/0006752 A1 Jan. 3, 2019

Related U.S. Application Data

(60) Provisional application No. 62/527,192, filed on Jun. 30, 2017.

(30) Foreign Application Priority Data

Apr. 25, 2018 (CN) .......................... 2018 1 0380006

(51) Int. Cl.
*H01Q 3/26* (2006.01)
*G01S 3/42* (2006.01)
(Continued)

(52) U.S. Cl.
CPC ............ *H01Q 3/2605* (2013.01); *G01S 3/38* (2013.01); *G01S 3/42* (2013.01); *H01Q 3/247* (2013.01); *H01Q 21/061* (2013.01)

(58) Field of Classification Search
CPC .... H01Q 3/2605; H01Q 3/247; H01Q 21/061; G01S 3/38; G01S 3/42
See application file for complete search history.

(56) References Cited

U.S. PATENT DOCUMENTS

2018/0205156 A1* 7/2018 Li .......................... G02F 1/1313
2019/0221933 A1* 7/2019 Asagi ....................... H01Q 3/34

FOREIGN PATENT DOCUMENTS

| CN | 103198284 A | 7/2013 |
|----|-------------|--------|
| CN | 103297104 A | 9/2013 |
| WO | 2015/126550 A1 | 8/2015 |

OTHER PUBLICATIONS

European Search Report dated Nov. 6, 2018, issued in application No. 18180350.3.
(Continued)

*Primary Examiner* — Awat M Salih
(74) *Attorney, Agent, or Firm* — McClure, Qualey & Rodack, LLP (57) ABSTRACT

A liquid-crystal antenna apparatus is provided. The liquid-crystal antenna apparatus includes: a liquid-crystal antenna unit and a control unit. The liquid-crystal antenna unit is configured to receive a wireless signal. The liquid-crystal antenna unit includes a plurality of microwave elements, and each of the microwave elements includes a first electrode, a second electrode opposite to the first electrode, and a liquid-crystal cell disposed between the first electrode and the second electrode. The control unit is electrically connected to the liquid-crystal antenna unit, and is configured to control the liquid-crystal antenna unit to form a first beam having a first direction. The control unit determines a source orientation of the wireless signal according to the wireless signal received by the liquid-crystal antenna unit, and controls the first direction of the first beam to direct toward the source orientation.

5 Claims, 12 Drawing Sheets

(51) Int. Cl.
*G01S 3/38* (2006.01)
*H01Q 3/24* (2006.01)
*H01Q 21/06* (2006.01)

(56) References Cited

OTHER PUBLICATIONS

Perez-Palomino, G., et al.; "Design and Demonstration of an Electronically Scanned Reflectarray Antenna at 100 GH Using Multiresonant Cells Based on Liquid Crystals;" IEEE Transactions on Antennas and Propagation; vol. 63; No. 8; Aug. 2015; pp. 3722-3727.

Hu, W., et al.; "Liquid-crystal-based Reflectarray Antenna with Electronically Switchable Monopulse Patterns;" Electronics Letters; vol. 43; No. 14; Jul. 2007; pp. 1-2.

Chinese language office action dated May 19, 2020, issued in application No. CN 201810380006.4.

\* cited by examiner

LIQUID-CRYSTAL ANTENNA APPARATUS AND METHOD FOR TRACKING WIRELESS APPARATUS USING THE SAME

CROSS REFERENCE TO RELATED APPLICATIONS

This application claims the benefit of U.S. Provisional Application No. 62/527,192 filed Jun. 30, 2017, and this application also claims priority of China Patent Application No. 201810380006.4, filed on Apr. 25, 2018, the entirety of which are incorporated by reference herein.

BACKGROUND OF THE DISCLOSURE

Field of the Disclosure

The present disclosure relates to an antenna apparatus, and, in particular, to a liquid-crystal (LC) antenna apparatus and a method for tracking a wireless apparatus using the same.

Description of the Related Art

In the age of 5th-generation (5G) wireless communication, directional antennas are required, and the energy of the wireless signal can be concentrated in a particular orientation. Thus, the interference to the other wireless apparatuses can be reduced, and waste of the signal energy is also reduced, thereby improving the quality of communication. In addition to directivity, the antenna should also be capable of quickly tracking wireless apparatuses to fit the requirements of signal quality in 5G communication.

BRIEF SUMMARY OF THE DISCLOSURE

A detailed description is given in the following embodiments with reference to the accompanying drawings.

In an exemplary embodiment, a liquid-crystal antenna apparatus is provided. The liquid-crystal antenna apparatus includes: a liquid-crystal antenna unit and a control unit. The liquid-crystal antenna unit is configured to receive a wireless signal. The liquid-crystal antenna unit includes a plurality of microwave elements, and each of the microwave elements includes a first electrode, a second electrode opposite to the first electrode, and a liquid-crystal cell disposed between the first electrode and the second electrode. The control unit is electrically connected to the liquid-crystal antenna unit, and is configured to control the liquid-crystal antenna unit to form a first beam having a first direction. The control unit determines the source orientation of the wireless signal according to the wireless signal received by the liquid-crystal antenna unit, and controls the first direction of the first beam to direct toward the source orientation.

In another exemplary embodiment, a liquid-crystal antenna apparatus is provided. The liquid-crystal antenna apparatus includes: a liquid-crystal antenna unit and a control unit. The liquid-crystal antenna unit is configured to receive a wireless signal. The liquid-crystal antenna unit includes a plurality of microwave elements, and each of the microwave elements includes a first electrode, a second electrode opposite to the first electrode, and a liquid-crystal cell disposed between the first electrode and the second electrode. The control unit is electrically connected to the liquid-crystal antenna unit, and is configured to control the liquid-crystal antenna unit to form a first beam having a first direction. The control unit controls the liquid-crystal antenna unit to alternate the first direction of the first beam in a first time interval, and determines the source orientation of the wireless signal according to the wireless signal received by the liquid-crystal antenna unit. The control unit controls the liquid-crystal antenna unit to direct the first direction of the first beam toward the source orientation in a second time interval later than the first time interval.

In yet another exemplary embodiment, a method for tracking a wireless apparatus using a liquid-crystal antenna apparatus is provided. The liquid-crystal antenna apparatus includes a liquid-crystal antenna unit having a plurality of microwave elements. The method includes the steps of: receiving a wireless signal via at least a part of the microwave elements; determining a source orientation of the wireless signal according to the wireless signal received by the microwave elements; and controlling a direction of a first beam formed by at least a part of the microwave elements to substantially direct toward the source orientation of the wireless signal.

BRIEF DESCRIPTION OF THE DRAWINGS

The present disclosure can be more fully understood by reading the subsequent detailed description and examples with references made to the accompanying drawings, wherein.

DETAILED DESCRIPTION OF THE DISCLOSURE

The following description is made for the purpose of illustrating the general principles of the disclosure and should not be taken in a limiting sense. The scope of the disclosure is determined by reference to the appended claims.

Figure 1A:
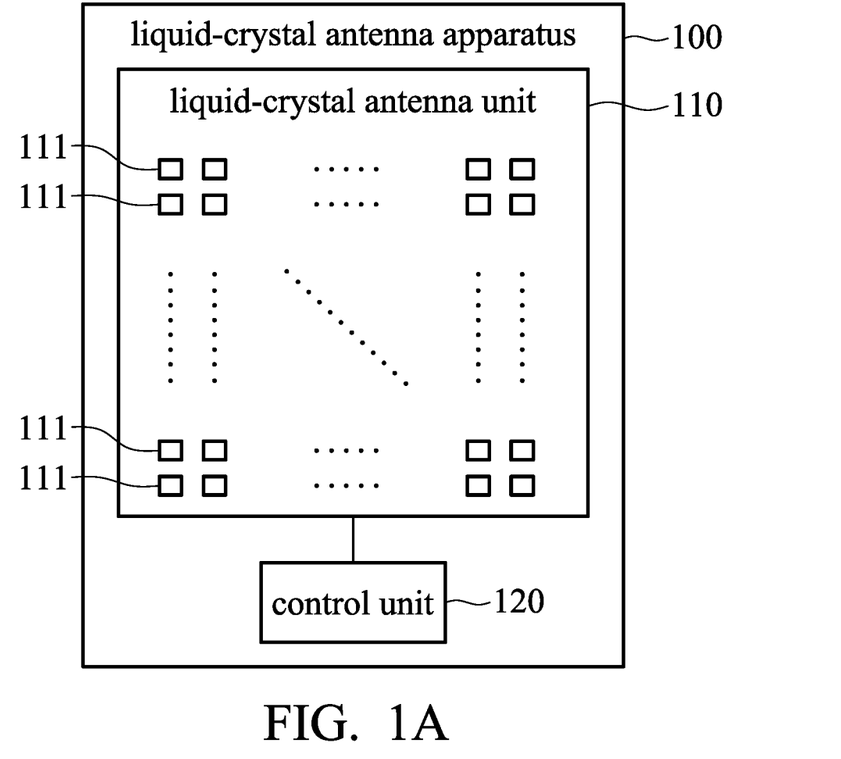
FIG. 1A is a diagram of a liquid-crystal antenna apparatus in accordance with an embodiment of the disclosure.

FIG. 1A is a diagram of a liquid-crystal antenna apparatus 100 in accordance with an embodiment of the disclosure. As illustrated in FIG. 1A, the liquid-crystal antenna apparatus 100 includes a plurality of microwave elements 111 and a control unit 120. In an embodiment, the microwave elements 111 are configured to receive or transmit wireless signals. The control unit 120 is configured to control the microwave elements 111 to transmit a beam and receive wireless signals. For example, the control unit 120 may be a general-purpose processor, a digital signal processor (DSP), or a micro-controller, but the disclosure is not limited thereto. In an embodiment, the microwave elements 111 may be divided into one or more liquid-crystal antenna units 110. For purposes of description, one liquid-crystal antenna unit 110 is illustrated in FIG. 1A.

Figure 1B:
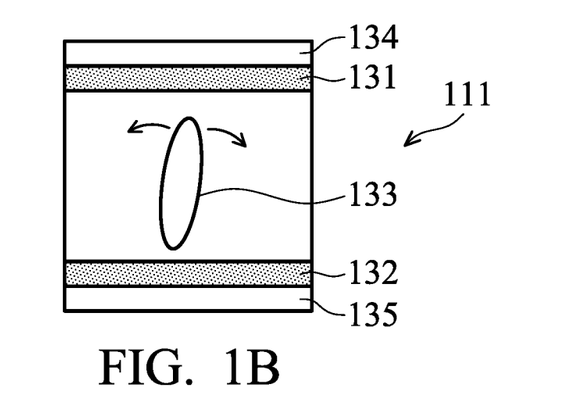
FIG. 1B is a diagram of the microwave element in accordance with an embodiment of the disclosure.

FIG. 1B is a diagram of the microwave element 111 in accordance with an embodiment of the disclosure. For example, each of the microwave elements 111 includes a first substrate 134, a first electrode 131 disposed on the first substrate 134, a second substrate 135, and a second electrode 132 disposed on the second substrate 135, and a liquid-crystal cell 133. The first electrode 131 and the second electrode 132 are disposed on opposite sides of the liquid-crystal cell 133, as illustrated in FIG. 1B. The control unit 120 may send a control signal (e.g., a bias voltage signal) to the first electrode 131 and/or the second electrode 132 of each of the microwave elements 111 to adjust the orientation of the liquid-crystal molecules of the liquid-crystal cell 133. Specifically, the control unit 120 may steer the beam formed by each of the microwave elements 111. Alternatively, the microwave elements 111 are divided into a plurality of regions, and the control unit 120 may steer the beam formed by the microwave elements 111 in each region.

Figure 2A:
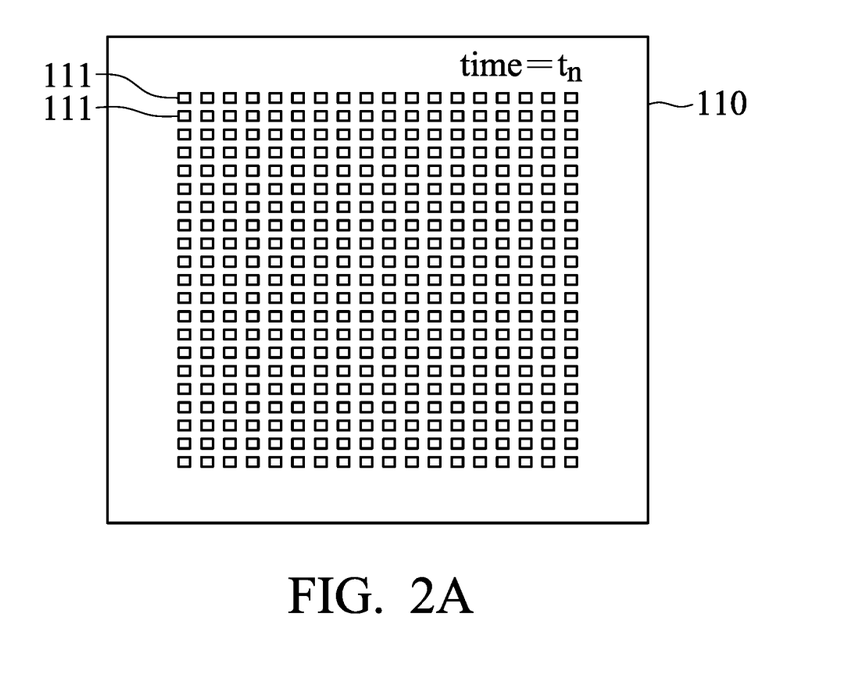
FIGS. 2A~2C are diagrams of activating tracking sections in the liquid-crystal antenna unit using time-division multiplexing in accordance with an embodiment of the disclosure.
Figure 2B:
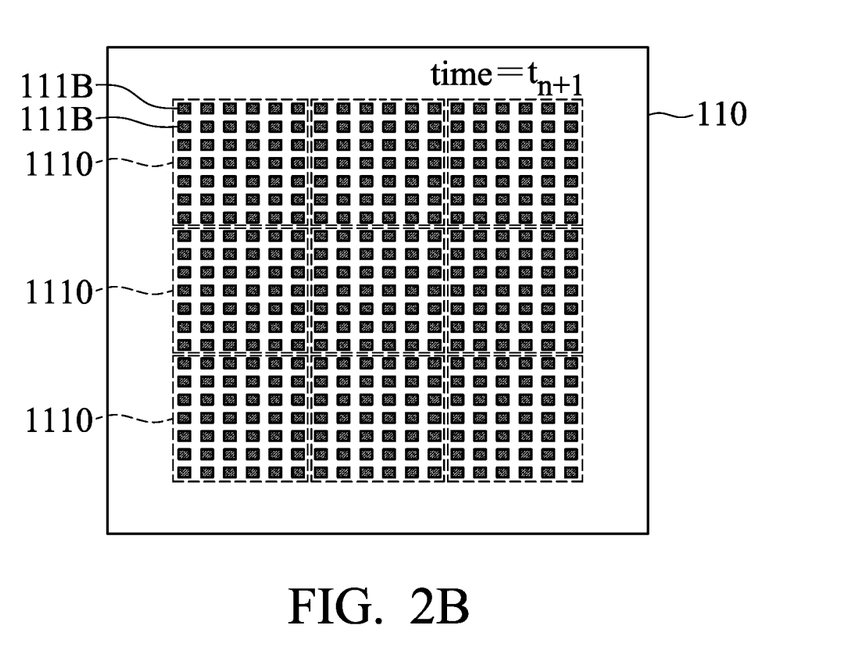
Figure 2C:
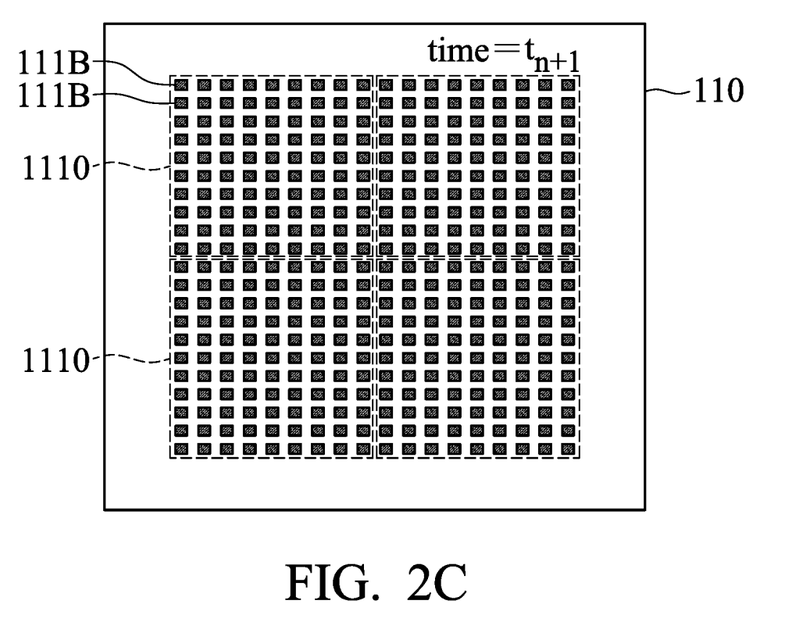

FIGS. 2A~2C are diagrams of activating tracking sections in the liquid-crystal antenna unit 110 using time-division multiplexing in accordance with an embodiment of the disclosure.

In an embodiment, all the microwave elements 111 in the liquid-crystal antenna unit 110 can be divided into one or more tracking sections 1110, as illustrated in FIG. 2B and FIG. 2C. The control unit 120 may activate or deactivate the tracking sections 1110 using time-division multiplexing.

For example, as illustrated in FIG. 2A, at time $t_n$, the control unit 120 deactivates the tracking sections 1110, and the control unit 120 determines the source orientation of the wireless signal received by the microwave elements 111.

As illustrated in FIG. 2B, at time $t_{n+1}$, the control unit 120 activates the tracking sections 1110, and the microwave elements 111 in each of the tracking sections 1110 can be regarded as tracking microwave elements 111B.

FIG. 2C shows another example of dividing the microwave elements 111 into the tracking sections 1110. The number of tracking microwave elements 111B in each of the tracking sections 1110 in FIG. 2C is greater than that in FIG. 2B. That is, at time $t_{n+1}$, the control unit 120 may use another division methodology to activate the tracking sections 1110.

Referring to FIG. 2B and FIG. 2C, the control unit 120 may drive each of the tracking sections 1110 to alternate its directivity toward different directions, and each of the tracking sections 1110 may receive wireless signals from different angles.

For example, when a wireless apparatus steers a wireless signal from a certain orientation, the wireless signal received by each of the tracking sections 1110 may have different signal characteristics since the directivities of the tracking sections 1110 are different from each other. Accordingly, the control unit 120 may calculate the source orientation of the wireless signal transmitted by the wireless apparatus according to the characteristics of the wireless signal received by each of the tracking sections 1110. The wireless apparatus may be a mobile communication apparatus, a base station, or a communications satellite, but the disclosure is not limited thereto.

Then, the control unit 120 may drive a portion of or all of the microwave elements 111 in the liquid-crystal antenna unit 110, so that the beam formed by the driven microwave elements 111 to direct toward the source orientation of the wireless signal. As the location of the wireless apparatus changes, the characteristics of the wireless signal received by each of the tracking sections 1110 may vary accordingly. Thus, the control unit 120 may further calculate the new source orientation of the wireless signal transmitted by the wireless apparatus after movement according to the characteristics of the wireless signals received by each of the tracking sections 1110, thereby achieving the function of tracking the wireless apparatus.

In some embodiments, in the initial state, the control unit 120 may activate a portion of or all of the tracking sections 1110, and the microwave elements 111 in the remaining tracking sections 1110 are not activated. Responsive to the determination of the source orientation of the wireless signal by the control unit 120, the control unit 120 may activate all of or some selected microwave elements to form a beam to direct toward the source orientation of the wireless signal.

Figure 3A:
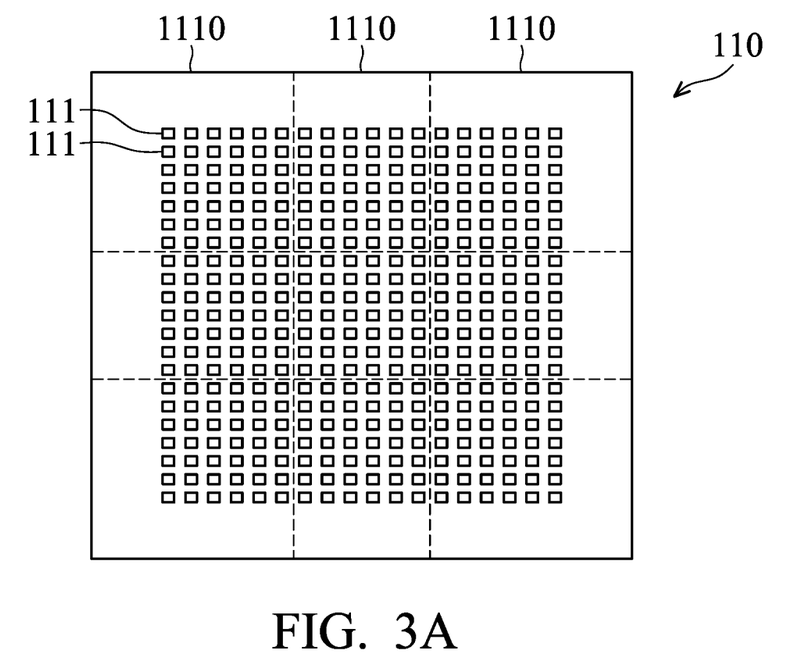
FIGS. 3A~3B are diagrams of different divisions of the tracking sections in accordance with another embodiment of the disclosure.
Figure 3B:
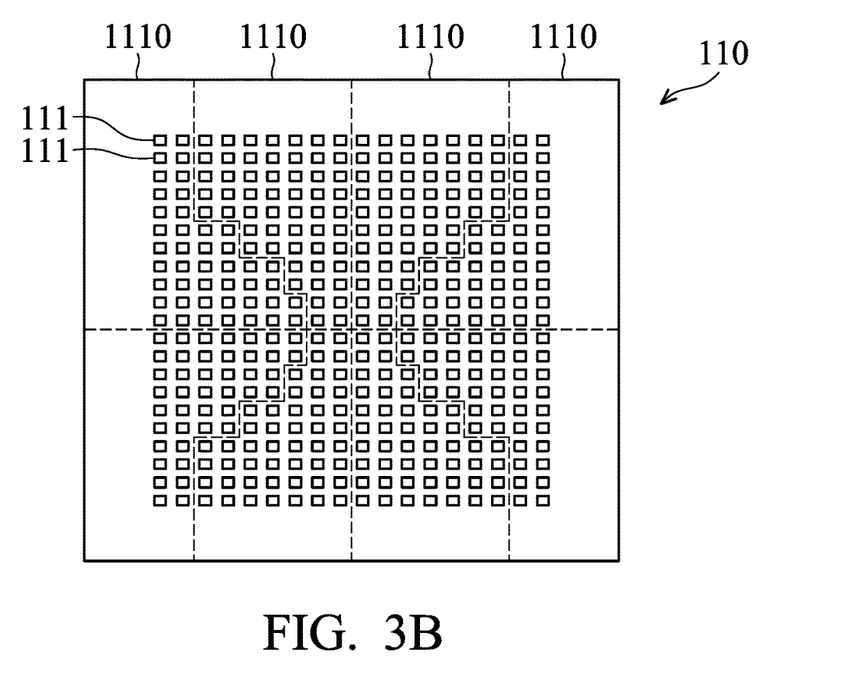

FIGS. 3A~3B are diagrams of different divisions of the tracking sections in accordance with another embodiment of the disclosure. All of the microwave elements 111 in the liquid-crystal antenna unit 110 can be divided into one or more tracking sections 1110 using different ways. In an embodiment, as illustrated in FIG. 3A, the control unit 120 may divide all of the microwave elements 111 into a plurality of tracking sections 1110 that forms a 3×3 grid.

In another embodiment, as illustrated in FIG. 3B, the control unit 120 may symmetrically divide all of the microwave elements 111 into a plurality of tracking sections 1110 relative to the center of the two-dimensional array of the microwave elements 111.

It should be noted that the divisions of the microwave elements 111 into one or more tracking sections 1110 are not limited to the divisions shown in FIG. 3A and FIG. 3B. For example, the divisions of the tracking sections 1110 may be in different shapes such as a cone, a triangle, a rectangular, a polygon, a non-regular shape, or a ring shape, but the disclosure is not limited thereto.

Figure 4A:
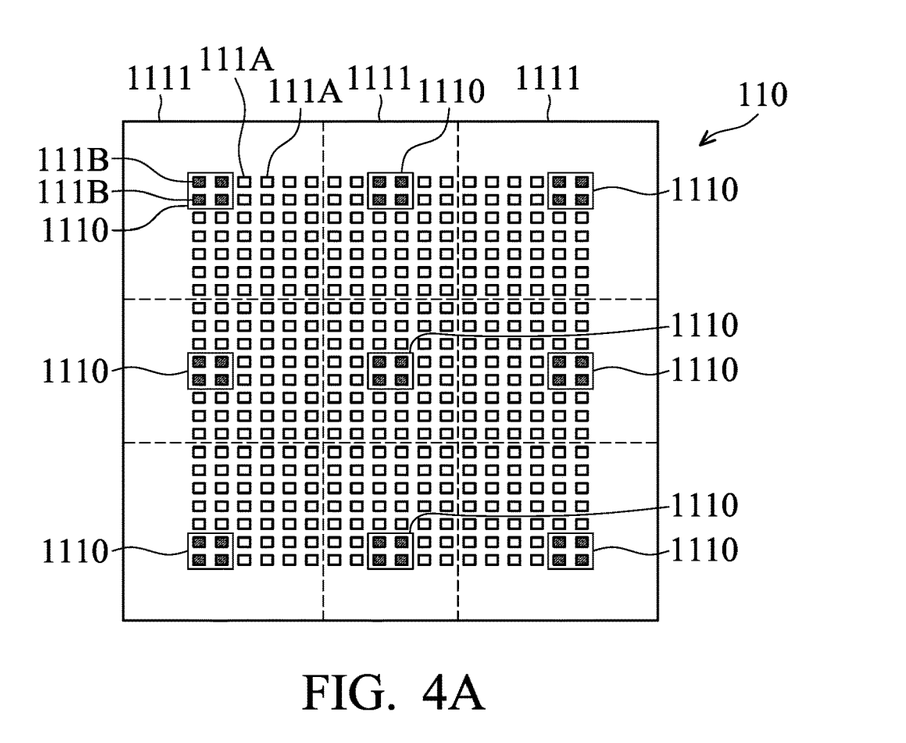
FIGS. 4A~4C are diagrams of different divisions of the tracking sections in accordance with yet another embodiment of the disclosure.
Figure 4B:
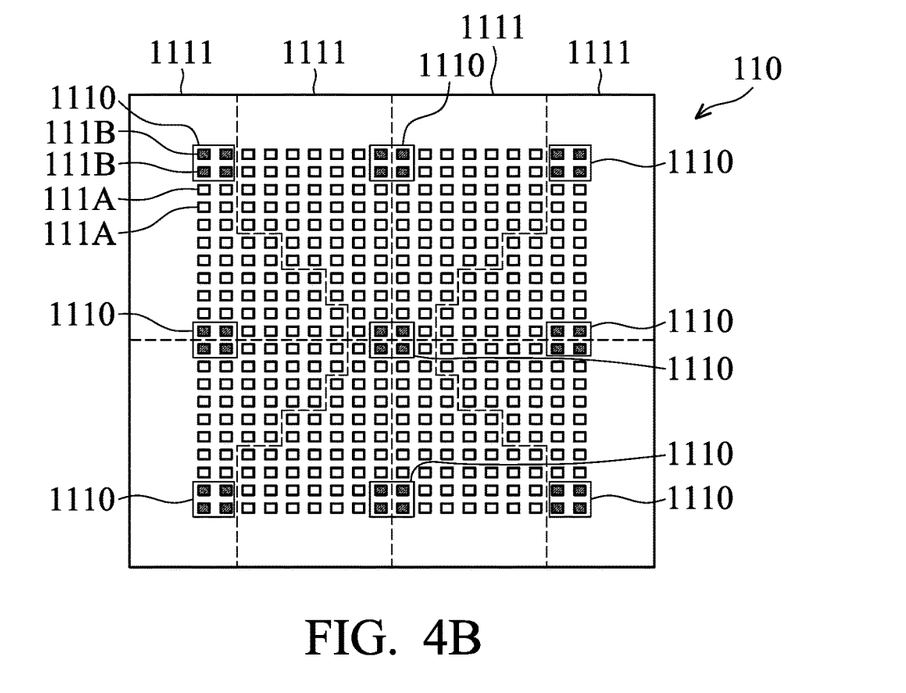
Figure 4C:
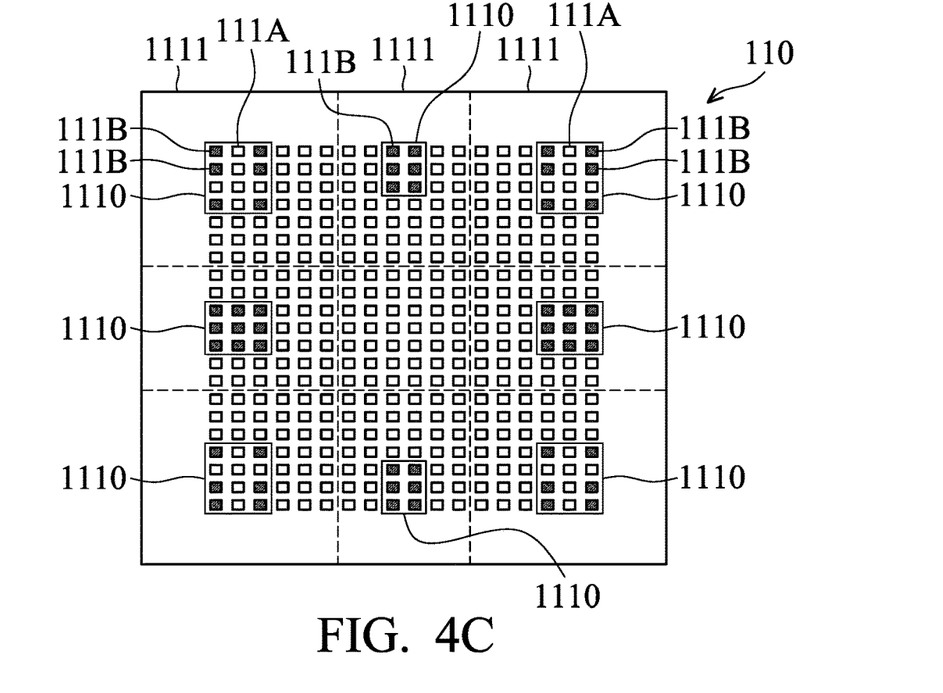

FIGS. 4A~4C are diagrams of different divisions of the tracking sections in accordance with yet another embodiment of the disclosure. In yet another embodiment, as illustrated in FIG. 4A, the control unit 120 may divide the microwave elements 111 of the liquid-crystal antenna unit 110 into a plurality of regions 1111 that forms a 3×3 grid, and the microwave elements 111 in each of the regions 1111 are classified into a first portion and a second portion. The first portion of the microwave elements indicates the one or more tracking microwave elements 111B used as the tracking section 1110 in each of the regions 1111, and the second portions of the microwave elements indicates the remaining microwave elements 111A in each of the regions 1111.

That is, the control unit 120 may select the first portion of the microwave elements 111 (e.g., tracking microwave elements 111B) in each of the regions 1111 as the tracking section 1110, and each of the tracking sections 1110 has a directivity for receiving wireless signals, and the directivities of the tracking sections 1110 may be different. The control unit 120 may determine the source orientation of the wireless signal according to the wireless signal received by each of the tracking sections 1110. The control unit 120 may designate the microwave elements 111A in one or more regions to form a beam to direct toward the source orientation of the wireless signal.

Similarly, in FIG. 4B, the control unit 120 may use another symmetrical division to divide the microwave elements 111 of the liquid-crystal antenna unit 110 into a plurality of regions 1111. In FIG. 4A and FIG. 4B, the control unit 120 may select fixed tracking microwave elements 111B as the tracking sections 1110, and the arrangement of the tracking microwave elements 111B in each of the tracking sections 1110 may be identical to each other.

As illustrated in FIG. 4C, the control unit 120 uses yet another symmetrical division to divide the microwave elements 111 of the liquid-crystal antenna unit 110 into a plurality of regions 1111, and the arrangement of the tracking microwave elements 111B in each of the tracking sections 1110 may be different.

In view of the embodiments in FIGS. 4A~4C, it will be appreciated that there are one or more arrangements of the tracking microwave elements 111B of the tracking section 1110 in each of the regions 1111.

Figure 5A:
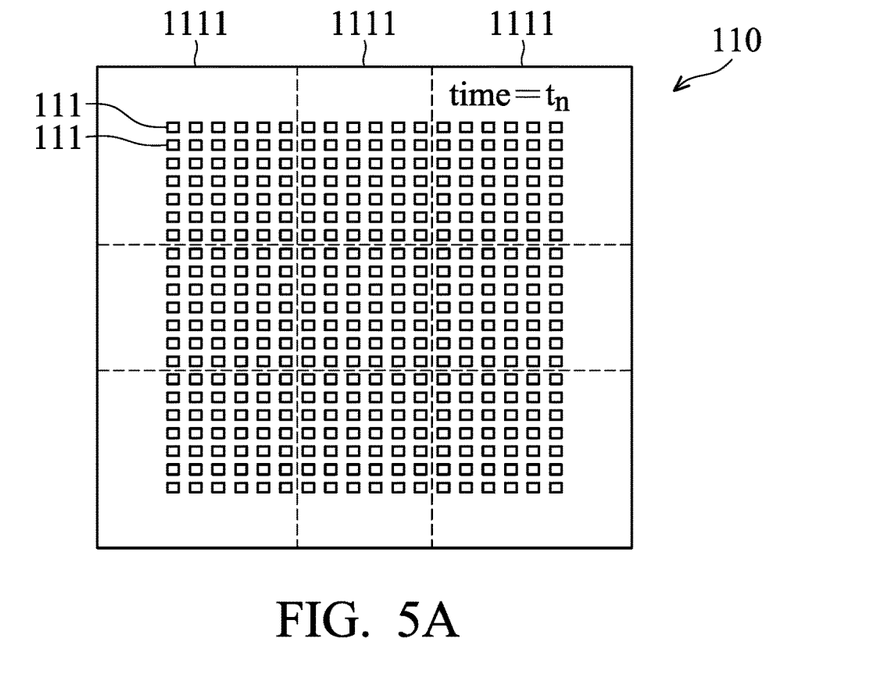
FIGS. 5A~5D are diagrams of activating tracking sections in the liquid-crystal antenna unit using time-division multiplexing in accordance with an embodiment of the disclosure.
Figure 5B:
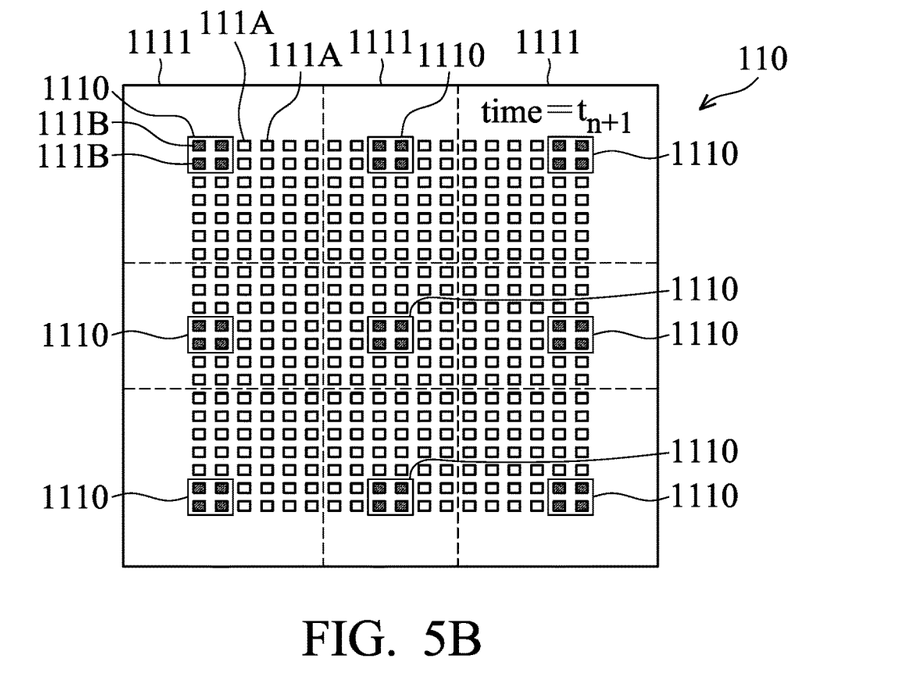

FIGS. 5A~5D are diagrams of activating tracking sections 1110 in the liquid-crystal antenna unit 110 using time-division multiplexing in accordance with an embodiment of the disclosure. In an embodiment, the control unit 120 may activate the tracking section 1110 in each of the regions 1111 in the liquid-crystal antenna unit 110 using time-division multiplexing. For example, as illustrated in FIG. 5A, at time $t_n$, the control unit 120 does not activate any of the tracking sections 1110 in each of the regions 1111 in the liquid-crystal antenna unit 110. As illustrated in FIG. 5B, at time $t_{n+1}$, the control unit 120 activates a portion of the microwave elements 111 (e.g., tracking microwave elements 111B) in each of the regions 1111 in the liquid-crystal antenna unit 110 as the tracking sections 1110, and each of the tracking sections 1110 has a different directivity for receiving wireless signals.

Figure 5C:
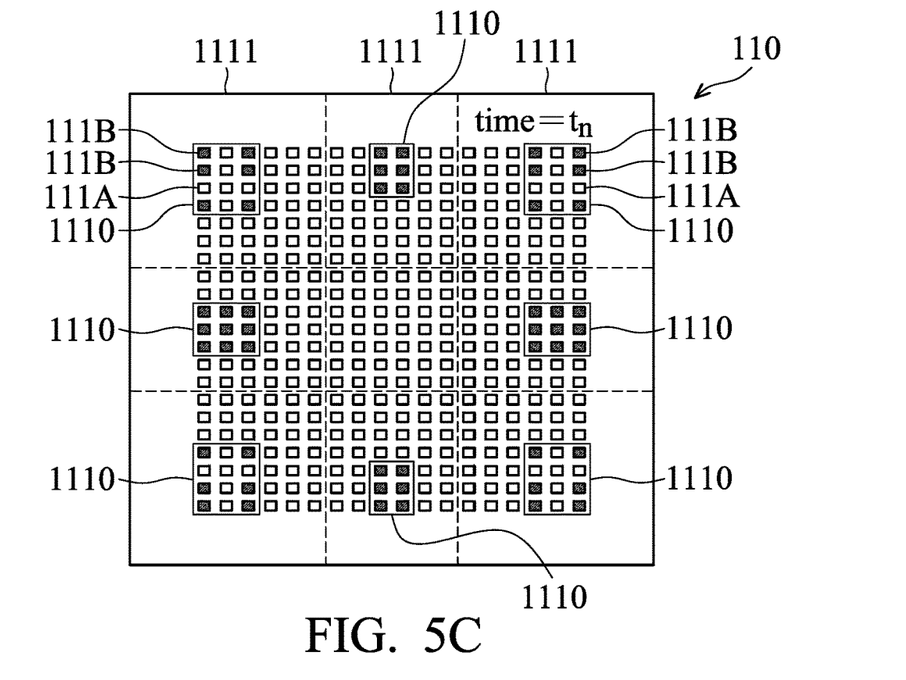
Figure 5D:
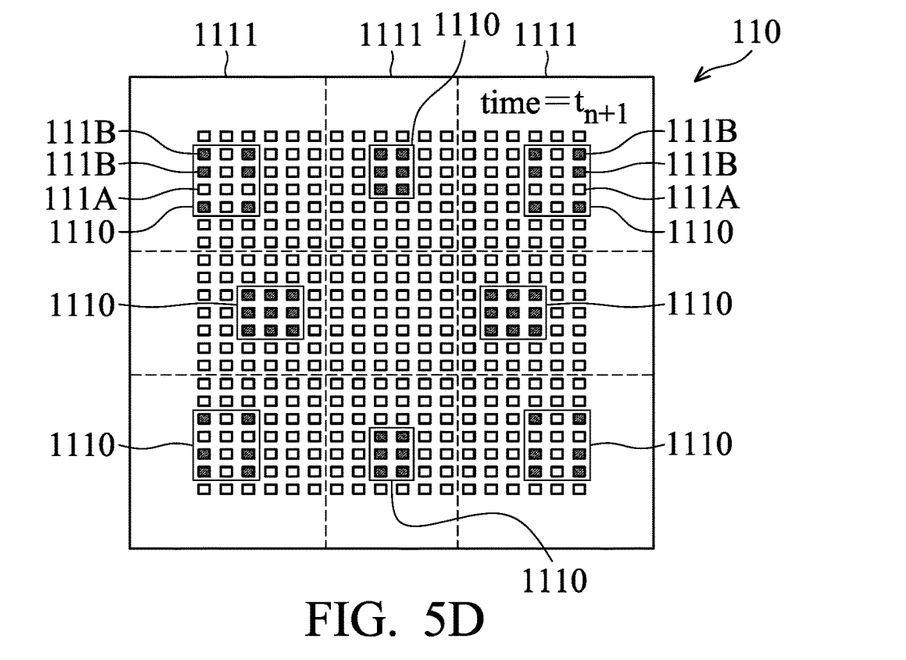

In another embodiment, as illustrated in FIG. 5C and FIG. 5D, the control unit 120 may alternate the positions or the arrangement of the tracking sections 1110 in each of the regions 1111 in the liquid-crystal antenna unit 110 using time-division multiplexing. For example, at time $t_n$, the control unit 120 activates the tracking section 1110 in each of the regions 1111 in the liquid-crystal antenna unit 110 using the arrangement shown in FIG. 5C. At time $t_{n+1}$, the control unit 120 activates the tracking section 1110 in each of the regions 1111 in the liquid-crystal antenna unit 110 using the arrangement shown in FIG. 5D. However, the positions of the tracking sections 1110 in FIG. 5D are slightly different from those in FIG. 5C.

Figure 6A:
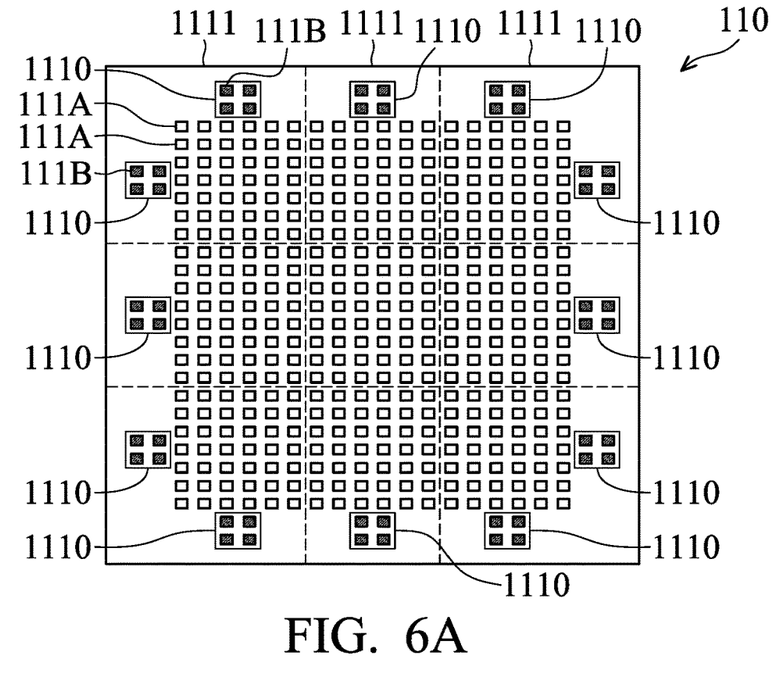
FIGS. 6A~6B are diagrams of the arrangement of the tracking sections in accordance with another embodiment of the disclosure.
Figure 6B:
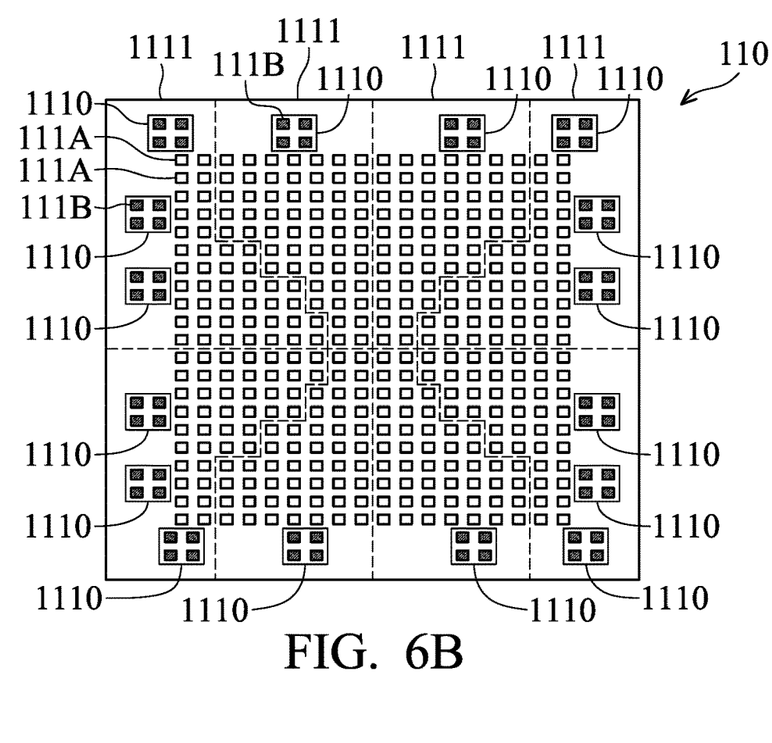

FIGS. 6A~6B are diagrams of the arrangement of the tracking sections 1110 in accordance with another embodiment of the disclosure. In another embodiment, the control unit 120 may divide all of the microwave elements 111 into a plurality of regions 1111 using the arrangement shown in FIG. 4A or FIG. 4B, and the microwave elements 111 in each of the regions 1111 can be classified into a plurality of first microwave elements 111B and a plurality of second microwave elements 111A. The second microwave elements 111A are arranged into a two-dimensional array, and the first microwave elements 111B are disposed around the two-dimensional array to form one or more tracking sections 1110, as illustrated in FIG. 6A and FIG. 6B.

Figure 7:
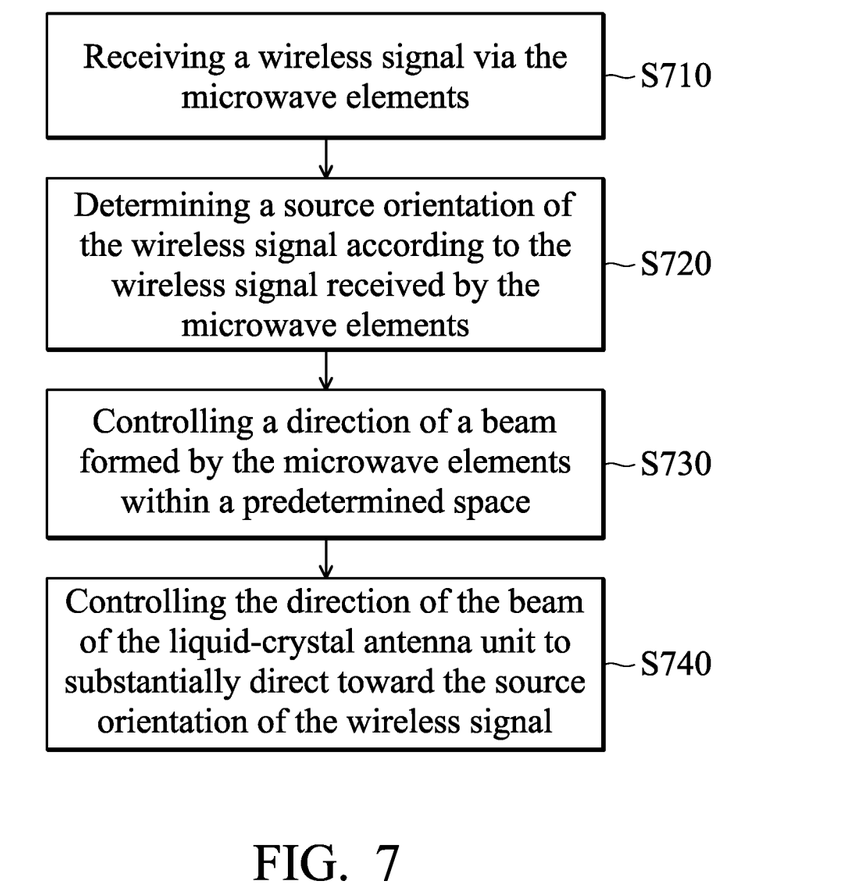
FIG. 7 is a flow chart of a method of tracking a wireless apparatus using the liquid-crystal antenna apparatus in accordance with an embodiment of the disclosure.

FIG. 7 is a flow chart of a method of tracking a wireless apparatus using the liquid-crystal antenna apparatus 110 in accordance with an embodiment of the disclosure.

In step S710, a wireless signal is received by the microwave elements 111.

In step S720, the source orientation of the wireless signal is determined according to the wireless signal received by the microwave elements 111. For example, the microwave elements 111 may receive the wireless signal using an active scan or a passive reception, wherein the passive reception can be referred to in the embodiments of FIGS. 2~6, and thus the details of the passive reception will be omitted here. The details of the active scan can be found in the embodiment of FIG. 8.

Figure 9A:
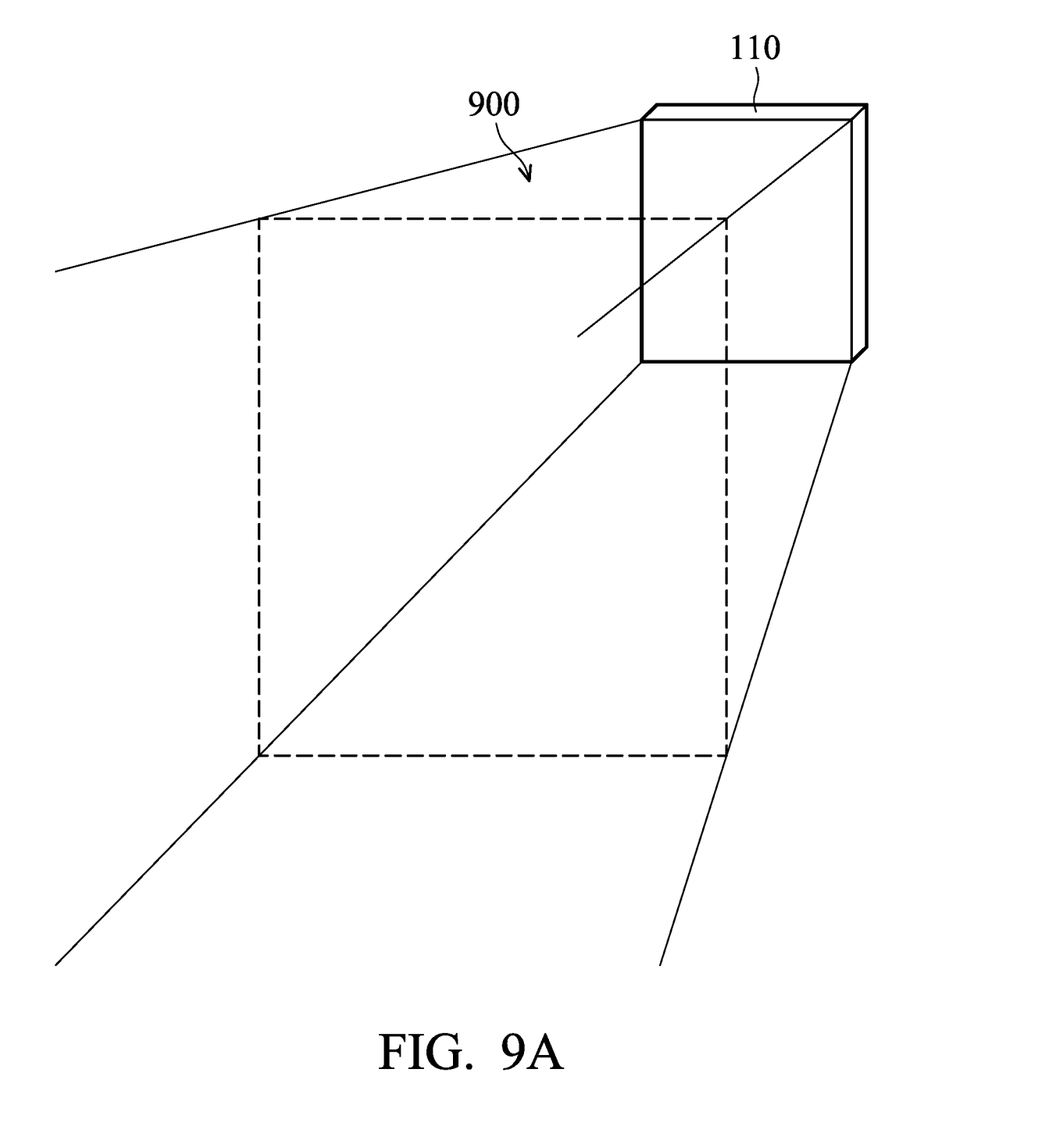
FIG. 9A is a diagram of a predetermined space for operation by the liquid-crystal antenna unit in accordance with an embodiment of the disclosure.
Figure 9B:
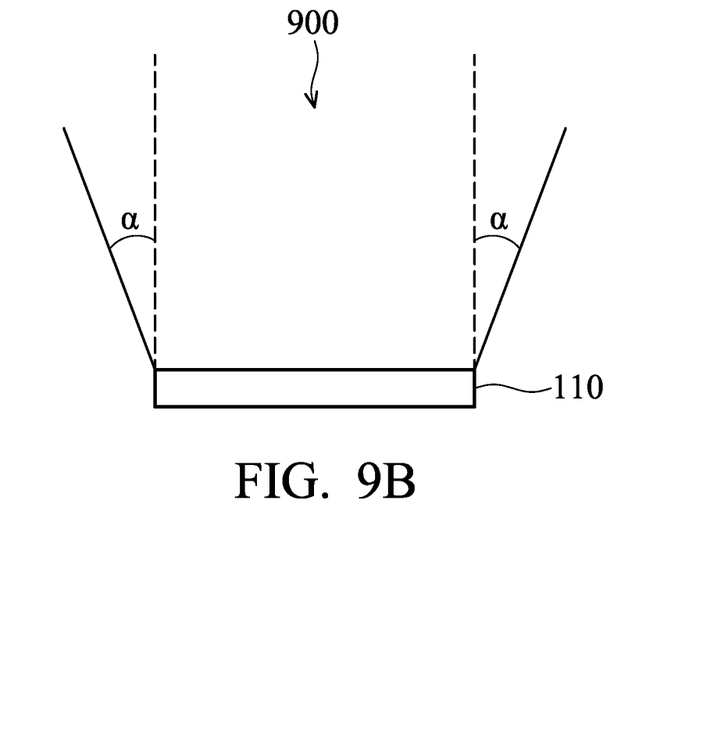
FIG. 9B is a top view of the liquid-crystal antenna unit in accordance with the embodiment of FIG. 9A.
Figure 9C:
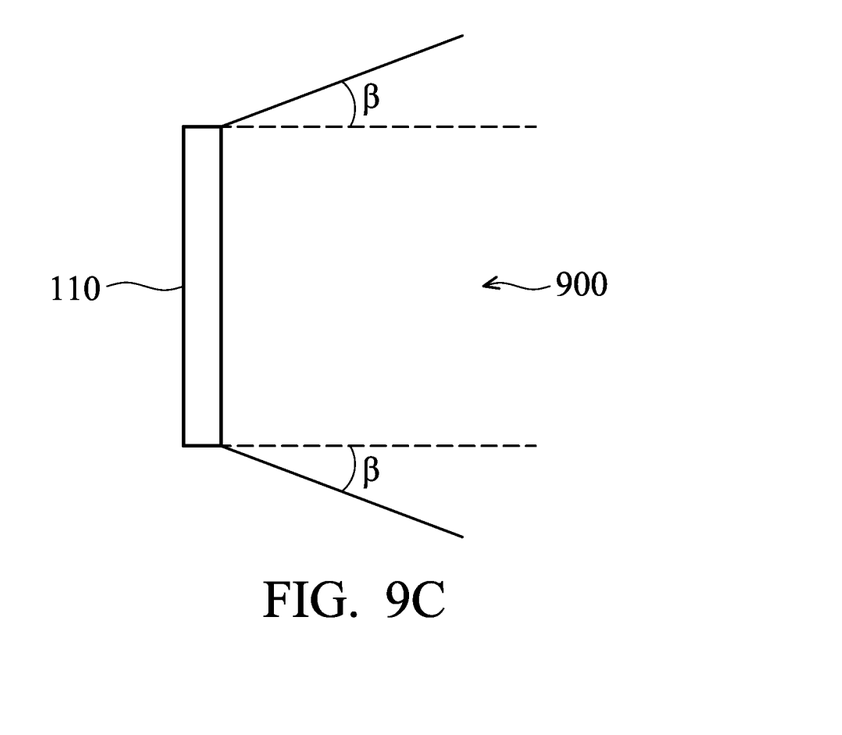
FIG. 9C is a side view of the liquid-crystal antenna unit in accordance with the embodiment of FIG. 9A.

In step S730, the direction of a beam formed by the microwave elements 111 is controlled within a predetermined space. For example, the direction of the beam formed by the liquid-crystal antenna unit 110 can be operated within a three-dimensional space, as illustrated in FIG. 9A which is a diagram of a predetermined space 900 for operation by the liquid-crystal antenna unit 110 in accordance with an embodiment of the disclosure. FIG. 9B is a top view of the liquid-crystal antenna unit 110 in accordance with the embodiment of FIG. 9A. The direction of the beam of the liquid-crystal antenna unit 110 can be operated within a respective range of an angle α exterior to the left side and the right side of the liquid-crystal antenna unit 110, as illustrated in FIG. 9B. FIG. 9C is a side view of the liquid-crystal antenna unit 110 in accordance with the embodiment of FIG. 9A. The direction of the beam of the liquid-crystal antenna unit 110 can be operated within a respective range of an angle β exterior to the top side and the bottom side of the liquid-crystal antenna unit 110. The angles α and β may be the same in some embodiments, or different in other embodiments.

In step S740, the direction of the beam of the liquid-crystal antenna unit 110 is controlled to substantially direct toward the source orientation of the wireless signal. If the wireless apparatus is moving, the source of the wireless signal may be shifted a distance from the original source location due to motion after the beam is controlled to direct toward the calculated source orientation. Since the liquid-crystal antenna unit 110 is capable of tracking the wireless apparatus, the direction of the beam form by the liquid-crystal antenna unit 110 can be repeatedly calibrated to substantially direct toward the source orientation of the wireless signal.

Figure 8:
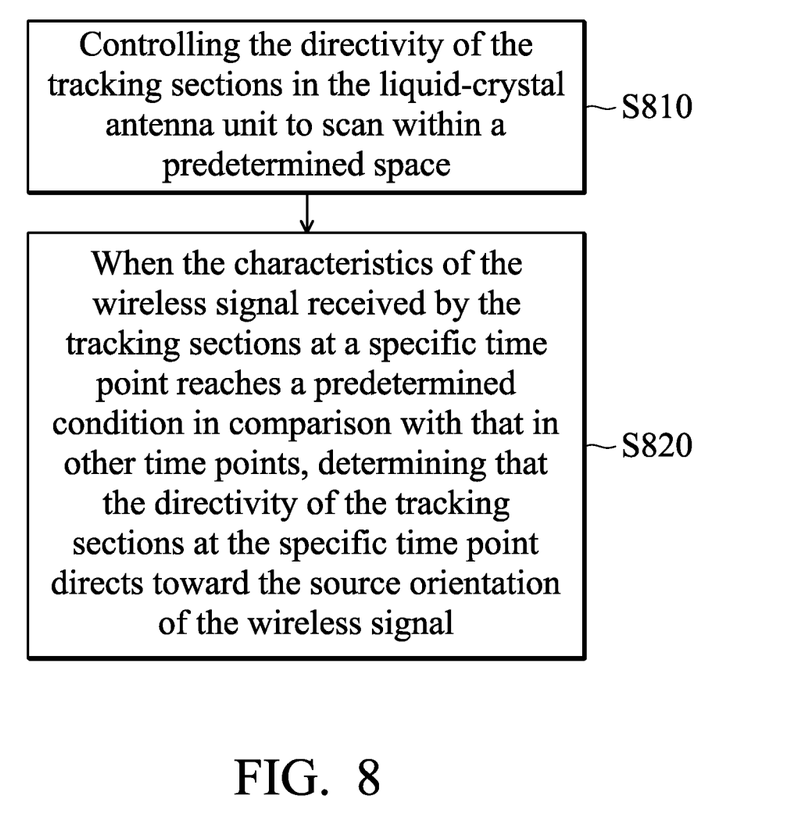
FIG. 8 is a flow chart of a method for determining the source orientation of the wireless signal using an active scan in accordance with another embodiment of the disclosure.

FIG. 8 is a flow chart of a method for determining the source orientation of the wireless signal using an active scan in accordance with another embodiment of the disclosure. In another embodiment, in step S810, the control unit 120 controls the directivity of the tracking sections 1110 in the liquid-crystal antenna unit 110 to scan within a predetermined space, wherein the above-mentioned scan is regarded as an active scan. It indicates that the directivity of the tracking sections 1110 may have an angle change at every time point such as time points from $t_0$ to $t_n$. However, the angle change is not limited to the change toward the upper direction/bottom directions, or left/right directions of the liquid-crystal antenna unit 110. At last, the directivity of the tracking sections 1110 may sweep the whole predetermined space. In addition, the division of the tracking sections 1110 can be referred to in the aforementioned embodiments.

In step S820, when the characteristics of the wireless signal received by the tracking sections 1110 at a specific time point reaches a predetermined condition (e.g., having the relatively maximum signal strength) in comparison with that in other time points, the control unit 120 may determine that the directivity of the tracking sections 1110 at the specific time point directs toward the source orientation of the wireless signal, and steer the beam of the liquid-crystal antenna unit 110 to direct toward the source orientation of the wireless signal.

The direction of the beam formed by the liquid-crystal antenna unit 110 can be operated within a three-dimensional space. As illustrated in FIG. 9A, FIG. 9B, and FIG. 9C, the scan range of the directivity of the tracking sections 1110 of the liquid-crystal antenna unit 110 can be within the predetermined space 900 which includes a range of angle α exterior to the lines extended from the left side or the right side of the liquid-crystal antenna unit 110, and a range of angle β exterior to the lines extended from the upper side or the bottom side of the liquid-crystal antenna unit 110. The angles α and β may be the same in some embodiments, or different in other embodiments. That is, the direction of the beam (e.g., a first direction) formed by the liquid-crystal antenna unit 110 can be alternated within the predetermined space 900.

For example, in a first time interval (e.g., between time points $t_0 \sim t_n$), since the liquid-crystal antenna unit 110 performs the active scan to detect the source orientation of the wireless signal, a larger range is used for the active scan within the predetermined space 900. For example, the liquid-crystal antenna unit 110 may perform the active scan within the ranges of angles α and β as described above. When the control unit 120 determines the source orientation of the wireless signal using the tracking sections 1110 (e.g., determining the directivity of the tracking sections 1110 at the time point $t_m$, where 0<m<n), the control unit 120 controls the liquid-crystal antenna unit 110 at the second time interval (e.g. from time point $t_{n+1}$ to $t_{n+x}$, where x>1), so that the direction of the beam of the liquid-crystal antenna unit 110 may direct toward the source orientation of the wireless signal. Since the source of the wireless signal may move, the tracking sections 1110 of the liquid-crystal antenna unit 110 may scan the wireless signal with a shrunk range in the third time interval (e.g., from time point $t_{n+x+1}$ to $t_{n+x+y}$, where y>1). That is, the space for scanning the wireless signal is shrunk to a smaller space around the source orientation of the wireless signal, and the smaller space around the source orientation of the wireless signal is still within the predetermined space 900. For example, the smaller space may indicate a first range that has an angle exterior to a normal of a surface of the liquid-crystal antenna unit 110. Accordingly, the speed for tracking the source orientation of the wireless signal can be improved.

In view of the above, a liquid-crystal antenna apparatus and a method for tracking a wireless signal thereof are provided. The liquid-crystal antenna apparatus and the method is capable of quickly positioning and tracking the wireless apparatus and providing a better signal quality of signal transmission with the wireless apparatus using the adjustability of the directivity of the microwave elements in the liquid-crystal antenna apparatus. In addition, a portion of the microwave elements can be used as the tracking sections, and the stress time of the microwave elements can be reduced using the time-division multiplexing, beam management, and/or alternating arrangements of the microwave elements, thereby increasing the life time of the microwave elements.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A liquid-crystal antenna apparatus, comprising:
a liquid-crystal antenna unit, configured to receive a wireless signal, wherein the liquid-crystal antenna unit comprises a plurality of microwave elements, and each of the microwave elements comprises a first electrode, a second electrode opposite to the first electrode, and a liquid-crystal cell disposed between the first electrode and the second electrode; and
a control unit, electrically connected to the liquid-crystal antenna unit, configured to control the liquid-crystal antenna unit to form a first beam having a first direction,
wherein the control unit determines a source orientation of the wireless signal according to the wireless signal received by the liquid-crystal antenna unit, and controls the first direction of the first beam to direct toward the source orientation,
wherein the plurality of microwave elements are divided into a first portion and a second portion, and only the plurality of microwave elements in the first portion receive the wireless signal,
wherein the plurality of microwave elements in the first portion are divided into at least three regions, and each of the regions has a directivity,
wherein only the plurality of microwave elements in the second portion form the first beam,
wherein the liquid-crystal antenna unit simultaneously receives the wireless signal and forms the first beam.

2. The liquid-crystal antenna apparatus as claimed in claim 1, wherein the control unit changes position or arrangement of the first portion of the microwave elements in different time intervals.

3. A liquid-crystal antenna apparatus, comprising:
a liquid-crystal antenna unit, configured to receive a wireless signal, wherein the liquid-crystal antenna unit comprises a plurality of microwave elements, and each of the microwave elements comprises a first electrode, a second electrode opposite to the first electrode, and a liquid-crystal cell disposed between the first electrode and the second electrode; and
a control unit, electrically connected to the liquid-crystal antenna unit, configured to control the liquid-crystal antenna unit to form a first beam having a first direction,
wherein the control unit controls the liquid-crystal antenna unit to alternate the first direction of the first beam in a first time interval, and determines a source orientation of the wireless signal according to the wireless signal received by the liquid-crystal antenna unit,
wherein the control unit controls the liquid-crystal antenna unit to direct the first direction of the first beam toward the determined source orientation in a second time interval later than the first time interval,
wherein the first direction of the first beam is changed within a second range inside the first range in a third time interval later than the second time interval.

4. The liquid-crystal antenna apparatus as claimed in claim 3, wherein the first direction of the first beam is changed within a first range that has an angle exterior to a normal of a surface of the liquid-crystal antenna unit.

5. A method for tracking a wireless apparatus using a liquid-crystal antenna apparatus, wherein the liquid-crystal antenna apparatus comprises a liquid-crystal antenna unit having a plurality of microwave elements, the method comprising:
- receiving a wireless signal via at least a part of the microwave elements;
- determining a source orientation of the wireless signal according to the wireless signal received by the microwave elements; and
- controlling a direction of a first beam formed by at least a part of the microwave elements to substantially direct toward the source orientation of the wireless signal,
- wherein the microwave elements are divided into a first portion and a second portion, and only the microwave elements in the first portion receive the wireless signal,
- wherein the first portion of the microwave elements is divided into a plurality of regions, and each of the regions has a directivity,
- wherein only the second portion of the microwave elements forms the first beam,
- wherein the liquid-crystal antenna unit simultaneously receives the wireless signal and forms the first beam.

* * * * *